June 7, 1938.  S. F. DAVENPORT  2,119,805
FLY ROD LURE
Filed Oct. 9, 1935

Inventor
S. F. Davenport
By Eccleston & Eccleston
Attorneys

Patented June 7, 1938

2,119,805

UNITED STATES PATENT OFFICE 2,119,805

FLY ROD LURE

Sam F. Davenport, Garrett, Ind., assignor to Creek Chub Bait Company

Application October 9, 1935, Serial No. 44,291

8 Claims. (Cl. 43—42)

This invention relates to the manufacture of flyrod lures such as are used in casting, trolling and the like, and has for its primary object to produce an article of this type which is exceedingly simple and inexpensive in construction and yet which is so designed as to provide a substantially exact simulation of the movements of a minnow or other small fish traveling through the water.

Another object of the invention resides in combining with an ordinary spoon of conventional construction a weight which will prevent the ordinary revolving action which is common with spoons when drawn through the water and will convert the motion into a wiggling or swimming movement.

Other objects and advantages of the invention will appear from the following description when taken in connection with the accompanying drawing, in which, Figure 1 is a perspective view of the flyrod lure.

Figure 1:
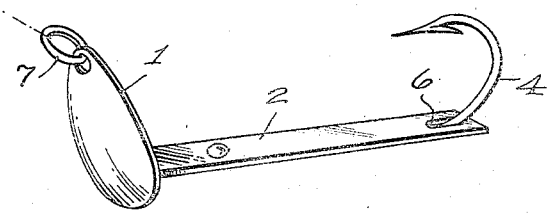
Figure 2:
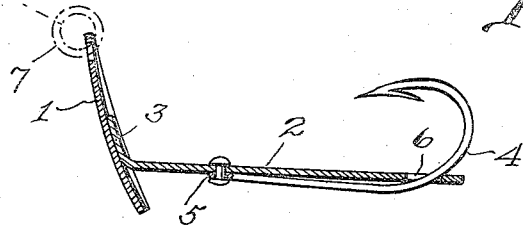
Figure 2 is a longitudinal sectional view of the lure.
Figure 3:
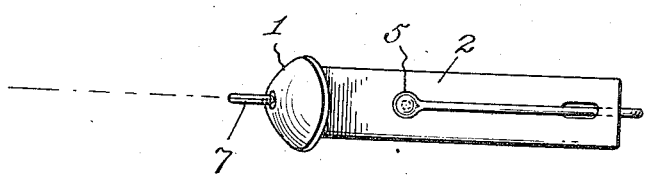
Figure 3 is a bottom plan view thereof.

Referring to the drawing in detail the numeral 1 indicates an ordinary concavo-convex spoon of substantially oval shape such as are commonly swivelled to fish lines. These spoons as ordinarily used are caused to revolve or spin as they are drawn through the water, and by reason of their shiny appearance and the commotion created in the water, attract the fish.

In accordance with the present invention however the spoon 1 is not allowed to spin by reason of a weight consisting of a flat bar 2 which is attached to the lower part of the spoon on the concave side thereof. This bar has an upturned forward end 3 which forms an obtuse angle with the bar and is soldered or otherwise connected to the spoon. The obtuse angle between the parts 2 and 3 of the bar is slightly greater than a right angle, the excess over 90° being the angle at which the spoon will incline to the vertical, and this angle of course may be varied as desired.

The numeral 4 indicates a fish hook having its eye 5 riveted or otherwise connected to the underside of the bar 2 and the opposite end of the shank portion extending through a slot 6 at the rear end of the bar.

The completed lure may be attached to a fish line by means of a ring 7 or other preferred means.

When retrieving the lure as above described there is a tendency for the spoon 1 to immediately take up its spinning movement but this tendency is curbed by the bar 2 and hook 4 whose weights are carried by the spoon at the point 3 which is substantially below the center of the spoon. As the spoon starts to revolve in one direction the weight 2—4 halts its movement and returns it to its perpendicular position and in so doing over-balances it so that it attempts to revolve in the opposite direction. The result of these restrictions on the ordinary revolving movement of the spoon is to impart to the entire lure a fast wiggling or swimming motion in close simulation of the swimming movements of a small fish.

From the above description and the accompanying drawing it will be apparent that the novel flyrod lure is extremely simple and inexpensive in construction in that it comprises merely a conventional spoon and fish hook combined in a particular way with a flat strip of metal; that the combination of elements provides a sturdy lure of this particular type; and that the arrangements of the parts is such that when the lure is drawn through the water a wiggling action in close simulation of the swimming motion of a small fish is imparted to it.

In accordance with the patent statutes I have described what I now believe to be the preferred form of construction, but it is intended that various minor changes be included within the scope of the appended claims. Moreover, the expression "approximately a right angle" appearing in the claims is intended to include obtuse angles such as indicated on the drawing.

What I claim is:

1. A fish lure including a plate having a convex forward side, means for attaching a line to the upper end of the plate, a bar secured to the rear side of the plate intermediate the ends of the latter and forming approximately a right angle therewith, and a fish hook rigidly connected to the bar.

2. A fish lure including a plate having a convex forward side, means for attaching a line to the upper end of the plate, a bar secured to the plate intermediate its upper and lower edges but adjacent the lower edge thereof and forming approximately a right angle therewith, and a fish hook rigidly connected to the bar.

3. A fish lure including a concavo-convex plate adapted to assume a substantially vertical position when in use, means for attaching a line to the upper end of the plate, a bar secured to the concave side of the plate intermediate the upper and lower ends of the latter and forming approximately a right angle therewith, and a fish hook connected with the bar.

4. A fish lure including a concavo-convex plate of substantially oval shape adapted to assume a substantially vertical position when in use, means for attaching a line to the upper end of the plate, a bar secured to the concave side of the plate adjacent the lower edge thereof and forming approximately a right angle therewith, and a fish hook secured to the bar.

5. A fish lure including a spoon having a line attaching means, a bar rigidly connected to the spoon intermediate the ends of the latter and forming approximately a right angle therewith, and a fish hook rigidly secured to the bar.

6. A fish lure including a spoon adapted to assume a substantially vertical position when in use and provided with a line attaching means at its upper end, a bar rigidly secured to the concave side of the spoon intermediate the ends thereof and extending rearwardly therefrom at approximately a right angle, and a fish hook rigidly secured to the bar.

7. A fish lure including a spoon adapted to assume a substantially vertical position when in use and provided with a line attaching means at its upper end, a bar rigidly secured to the concave side of the spoon intermediate the ends thereof and extending rearwardly therefrom at approximately a right angle, and a fish hook having its shank secured to the under-side of the bar and its hook portion extended upwardly through an opening adjacent the rear end of the bar.

8. A fish lure including a plate having a convex forward side and a concave rear side, means for attaching a line to the upper end of the plate, a bar extending rearwardly from the plate, said bar having an upwardly extending extension attached to the concave side of the plate and a hook secured to an intermediate portion of the bar, said extension having contacting relation to the concave side and being spaced a substantial distance from the upper and lower ends of the plate.

SAM F. DAVENPORT.